(12) United States Patent
Silverstone et al.

(10) Patent No.: US 9,235,101 B2
(45) Date of Patent: Jan. 12, 2016

(54) OPTICAL SOURCE

(71) Applicant: THE UNIVERSITY OF BRISTOL, Bristol (GB)

(72) Inventors: Joshua Wimbridge Silverstone, Bristol (GB); Damien Bonneau, Bristol (GB); Mark Gerard Thompson, Bristol (GB); Jeremy Lloyd O'Brien, Bristol (GB)

(73) Assignee: The University of Bristol, Bristol (GB)

( * ) Notice: Subject to any disclaimer, the term of this patent is extended or adjusted under 35 U.S.C. 154(b) by 151 days.

(21) Appl. No.: 14/182,468

(22) Filed: Feb. 18, 2014

(65) Prior Publication Data

US 2015/0261058 A1 Sep. 17, 2015

(30) Foreign Application Priority Data

Feb. 19, 2013 (GB) .................................. 1302895.6

(51) Int. Cl.
| | |
|---|---|
| *G02F 1/035* | (2006.01) |
| *G02F 1/225* | (2006.01) |
| *G02B 6/12* | (2006.01) |
| *G02B 6/122* | (2006.01) |

(Continued)

(52) U.S. Cl.
CPC ................ *G02F 1/225* (2013.01); *G02B 6/122* (2013.01); *G02B 6/12009* (2013.01); *B82Y 20/00* (2013.01); *G02F 2001/212* (2013.01); *G02F 2001/217* (2013.01); *Y10S 977/95* (2013.01)

(58) Field of Classification Search
CPC ........ B82Y 10/00; B82Y 20/00; B82Y 30/00; G02F 1/225; G02F 1/2255; G02F 2001/212

USPC .......................................... 385/3, 14; 977/950
See application file for complete search history.

(56) References Cited

U.S. PATENT DOCUMENTS

| | | | | |
|---|---|---|---|---|
| 7,639,953 | B2 * | 12/2009 | Spillane ................. | B82Y 10/00 250/214.1 |
| 8,676,063 | B2 * | 3/2014 | Arahira .................. | H04B 10/70 398/182 |

(Continued)

FOREIGN PATENT DOCUMENTS

WO          2008039261 A2       4/2008

OTHER PUBLICATIONS

Takesue, "1.5μm Band Hong-Ou-Mandel Experiment Using Photon Pairs Generated in Two Independent Optical Fibers," Conference on lasers and electro-optics, May 5-11, 2007, pp. 1-2, Optical Society of America.

(Continued)

*Primary Examiner* — Ellen Kim
(74) *Attorney, Agent, or Firm* — Kilpatrick Townsend & Stockton LLP

(57) ABSTRACT

An integrated optical device and method for generating photons by manipulating path entanglement is provided. An integrated optical splitter splits pump light between two interferometer arms wherein each arm comprises a substantially identical photon pair source configured to be able to convert at least one pump light photon into a signal and idler photon pair. An integrated optical combiner device in optical communication with a first and a second optical output path interferes light from the first and second arms and outputs the signal and idler photons by bunching the signal and idler photons together in one of the optical output paths, or anti-bunching the signal photon in one output path and the corresponding idler photon in the other optical output path.

33 Claims, 8 Drawing Sheets

(51) Int. Cl.
*G02F 1/21* (2006.01)
*B82Y 20/00* (2011.01)

(56) References Cited

U.S. PATENT DOCUMENTS

| | | |
|---|---|---|
| 2004/0109633 A1 | 6/2004 | Pittman et al. |
| 2008/0063015 A1 | 3/2008 | Trifonov et al. |
| 2009/0103736 A1 | 4/2009 | Pacher et al. |
| 2010/0079833 A1* | 4/2010 | Langford ............... B82Y 10/00 359/107 |
| 2011/0073783 A1* | 3/2011 | Arahira .................... G02F 1/39 250/493.1 |
| 2011/0211244 A1 | 9/2011 | Peters et al. |

OTHER PUBLICATIONS

United Kingdom Patent Application No. GB 1302895.6, Combined Search and Examination Report mailed Jul. 4, 2013, 5 pages.

Ou et al., "Evidence for phase memory in two-photon down conversion through entanglement with the vacuum," Physical Review A, Jan. 1, 1990, vol. 41, No. 1, The American Physical Society, 3 pages.

Chen et al., "Quantum-state engineering using nonlinear optical Sagnac loops," New Journal of Physics, Dec. 16, 2008, vol. 10, 19 pages.

Clemmen et al., "Continuous wave photon pair generation in silicon-on-insulator waveguides and ring resonators," Optics Express, Sep. 14, 2009, vol. 17, No. 19, Optical Society of America, 20 pages.

Mower et al., "Efficient generation of single and entangled photons on a silicon photonic integrated chip," Physical Review A, 2011, vol. 84, The American Physical Society, 7 pages.

Davanco et al., "Telecommunications-band heralded single photons from a silicon nanophotonic chip," Applied Physics Letters, Jun. 25, 2012, vol. 100, American Institute of Physics, 5 pages.

Lugani et al., "Electro-optically switchable spatial-mode entangled photon pairs using a modified Mach-Zehnder interferometer," Optic Letters, Sep. 1, 2012, vol. 37, No. 17, Optical Society of America, 4 pages.

* cited by examiner

OPTICAL SOURCE

CROSS-REFERENCE TO RELATED APPLICATION

This claims priority to United Kingdom Patent Application No. 1302895.6 filed with the United Kingdom Patent Office on Feb. 19, 2013, the entire contents of which are incorporated herein by reference.

TECHNICAL FIELD

The present invention relates to optical sources, particularly integrated optical sources that output single photons by manipulating spatially entangled quantum states.

BACKGROUND

Optical sources are used in a wide range of applications including telecommunications, optical sensing and reading/writing optical device media. Currently, the majority of optical devices are designed on the principles of classical optics, such as physical optics and geometrical optics. Thus, physical and geometrical optics are typically used when modelling the propagation behaviour of light. When light interacts with a physical material, for example by being absorbed, a quantum mechanical point of view of light being quantized photons can be used successfully to model and predict the behaviours of the photons.

The quantum theory of light however also predicts other light behaviours. One such behaviour is quantum entanglement which has no counterpart in classical optics. Quantum entanglement typically occurs when photons, commonly a pair of photons, interact and are together described by the same indefinite quantum state when physically separated. Once separated, the photons are correlated such that when a measurement is made on one of the photons, for example measuring the polarisation as vertically polarised, the other entangled photon immediately takes the appropriate correlated or anti correlated value, for example being horizontally polarised. Photons may be entangled in a variety of degrees of freedom including, but not limited to spatial entanglement and polarisation entanglement.

There are several methods of creating entangled photons. Typical methods use correlated photons created from the nonlinear elastic $\chi^{(2)}$ or $\chi^{(3)}$ susceptibilities of a medium to an input electromagnetic field where one or more input photons (often termed pump photons) get converted to two or more new correlated photons (often termed signal and idler photons). The signal and idler photons generated by the same nonlinear event are correlated because both are always generated during the event.

An example of creating two correlated photons using the $\chi^{(2)}$ susceptibility is parametric down conversion (PDC) or spontaneous parametric down conversion (SPDC) where the probability of converting an input photon to a signal and idler photon pair is linearly proportional to the intensity of the input pump.

An example of creating two correlated photons using the $\chi^{(3)}$ susceptibility is spontaneous four wave mixing (SFWM) where the probability of converting an input pump photon to a correlated photon pair is quadratically proportional to the intensity of the input pump because two pump photons are required to produce the two new photons.

One application that uses quantum entanglement is quantum cryptography. Quantum cryptography can be implemented using single photons or a pair of polarisation entangled photons. When using the latter technique, polarisation entangled photons are created using a non-linear process such as SPDC whereby pump photons are converted to entangled signal and idler photons. The converted signal and idler photons have the same polarisation but have different wavelengths. The signal and idler photons may be converted to the same polarisation as the pump photon or the orthogonal polarisation, whereby the efficiency for converting to an orthogonal polarisation is typically lower than converting to the same polarisation. In operation, a source of polarisation entangled photons sends idler photons of both horizontal and vertical polarisations to one user and sends the corresponding polarisation entangled signal photons to another user. The two users create quantum keys from the entangled photons.

US2009/0103736 describes a device for generating polarisation-entangled photons using an integrated optical waveguide device. Pump photons are split into two waveguide arms using an integrated optical splitter. Each arm has a Periodically Poled Lithium Niobate (PPLN) structure to down convert the pump photons. The PPLN waveguide arms [are not identical because they] are configured differently to one another so that one arm generates TE polarisation signal and idler photons whilst the other arm generates TM polarisation signal and idler photons. The optical modes output from the two arms are therefore distinguishable from one another. The arms are then recombined and the signal/idler photons are split using a polarisation insensitive wavelength separating device.

WO2008/039261 describes a device for generating polarisation-entangled photons using an integrated optical waveguide device that is similar to US2009/0103736. The arms in WO2008/039261 share a common down conversion device/structure, however one arm further contains a mode converter to orthogonally convert the polarisation state of the polarisation entangled signal/idler photons along that arm such that when the arms are recombined the polarisation entangled signal/idler photons from one arm are in a TE polarisation whilst the polarisation entangled signal/idler photons from the other arm are in a TM polarisation. The waveguide arms in WO2008/039261 are different. The optical modes output from the two arms are therefore distinguishable from one another.

Sources of single photons are useful for a variety of applications other than quantum cryptography such as quantum metrology and quantum computing. Proof-of-principle demonstrations for the generation, detection and manipulation of photons at the single-photon level have been shown however, these demonstrations usually involve large-scale optical elements and rely on un-scalable bulk single-photon sources and detectors. The following publications describe some existing set-ups for generating single photons.

"Telecommunications-band heralded single photons from a silicon nanophotonic chip"; Applied Physics Letters 100, 261104, 2012, Davanco et al; describes a silicon nanophotonic device made up of an array of coupled rings on a silicon photonic integrated chip.

"Evidence for phase memory in two-photon down conversion through entanglement with the vacuum"; Physical review A, vol. 41, no. 1, 1 Jan. 1990, Z. Y. Ou et al, describes a bulk optic experiment. FIG. 2 of this publication shows a pump beam split by a beam-splitter into two $LiIO_3$ sources, each configured to produce signal and idler photons along physically different output optical paths. The idler output paths of each source recombine at a first recombining beam splitter, whilst the signal output paths of each source recombine at a different second recombining beam splitter. The signal and idler photons generated by the same source do not occupy the same mode in the same physical channel.

"Continuous wave photon pair generation in silicon-on-insulator waveguides and ring resonators" Optics Express, Vol. 17 No. 19, 16559, 14 Sep. 2009 describes producing a distinguishable pair of photons in a single silicon waveguide.

SUMMARY

According to a first aspect of the invention there is provided an integrated optical device for generating photons, the device comprising: an integrated optical splitter configured to receive pump light; a first integrated optical arm optically coupled to the splitter and configured to receive a first portion of the pump light output from the splitter; a second integrated optical arm optically coupled to the splitter and configured to receive a second portion of the pump light output from the splitter; each arm comprising a photon pair source separate from and substantially identical to the photon pair source of the other arm; each photon pair source being configured to be able to convert at least one pump light photon into an signal and idler photon pair; each of the first and second arms being configured to guide pump, signal and idler optical waveguide modes; wherein the pump, signal and idler optical waveguide modes guidable by the first arm are indistinguishable from the respective pump, signal and idler optical waveguide modes guidable by the second arm; an integrated optical combiner device in optical communication with a first and a second optical output path and configured to be able to interfere light from the first and second arms and output the signal and idler photons by: bunching the signal and idler photons together in one of the optical output paths; or, anti-bunching the signal photon in one output path and the corresponding idler photon in the other optical output path.

The identical arms and identical photon pair sources in each of the said arms, provides identical probabilities of generating signal and idler pairs in each arm. This leads to the entangled state of there being a signal/idler pair in one or the other arm.

The device and method presented herein, manipulates optical path entanglement, to create either bunched or anti-bunched photon pairs at the output of the combiner device. Anti-bunching of photons occurs where the output path one photon (of the pair) takes is perfectly anti-correlated with the path the other photon (of the pair) takes. Bunching occurs where the path one photon (of the pair) takes is perfectly correlated with the output path that the other photon (of the pair) takes.

The following features may be combined with the first aspect of the invention and may be combinable, where applicable, with the third or fourth aspect of the invention.

The integrated optical device may comprise a phase shifter device configured to be able to impart a phase difference between the first and second arm.

The phase shifter device may comprise a thermo-optical phase shifter configured to provide localised heating to one of the waveguide arms.

The phase shifter device may be configured to be able to impart a phase difference between the arms of at least $\pi/2$.

The splitter comprises any one of a directional coupler, MMI coupler, X-coupler, star coupler or Y branch.

The combiner comprises any one of a directional coupler, MMI coupler, X-coupler, or star coupler.

In principle any suitable integrated optical coupler may be used that can comprises single mode input and output waveguides.

The integrated optical device may comprise an integrated optical input waveguide configured to input pump light to the splitter.

The first and second optical output paths may comprise separate integrated optical waveguides.

In principle, the photon pair sources may comprise a $\chi^{(2)}$ and/or a $\chi^{(3)}$ nonlinear medium. Preferably, the photon pair sources comprises a $\chi^{(3)}$ nonlinear medium.

The nonlinear medium may be configured to annihilate two pump photons to generate the photon pair using spontaneous four wave mixing. The nonlinear medium may be configured to annihilate one pump photon to generate the photon pair using spontaneous parametric down-conversion.

Each photon pair source may comprise an integrated optical waveguide.

Any of the integrated optical waveguides, combiner or splitter may comprise a silicon core material.

The splitter device may comprise a coupling ratio of approximately 50%.

The combiner device may comprise a coupling ratio of approximately 50%.

The photon pair source may comprise a ring resonator optically coupled to the associated integrated optical arm.

According to a second aspect of the invention there is provided an optical assembly comprising the integrated optical device as described in the first aspect and a pump light source.

The optical assembly may comprise an optical amplifier optically coupled between the pump light source and the splitter device.

The optical assembly may comprise a first wavelength filter optically coupled between the optical amplifier and the splitter device.

The optical assembly may comprise a second wavelength filter in optical communication with an output optical path. Preferably this is between the output of the combiner device and a detector. Preferably the second wavelength filter is directly optically coupled to an output waveguide of the integrated optical device.

The optical assembly may be configured such that any of the pump light source, optical amplifier, first and second wavelength filters are integrated with the said integrated optical device.

The optical assembly may be configured such that any of the wavelength filters comprise an Arrayed Waveguide Grating. Any wavelength filter may comprise a Fibre Bragg Grating (FBG).

The optical assembly may be configured such that the optical amplifier comprises a Semiconductor Optical Amplifier (SOA). Any of the amplifiers may comprise an Erbium Doped Fibre Amplifier (EDFA), a Ytterbium Doped Fibre Amplifier (YDFA), a Raman amplifier or any other suitable optical amplifier.

According to a third aspect of the invention there is provided a method for generating photons comprising the steps of: providing pump light; splitting the pump light, at a first location with an optical splitter device, into separate first and second optical arms; wherein each arm comprises a photon pair source separate from and substantially identical to the photon pair source of the other arm; converting at least one pump light photon into a signal and idler photon pair in a photon pair source of at least one of the optical arms; the said at least one optical arm being configured to guide pump, signal and idler optical modes that are indistinguishable from the respective pump, signal and idler optical waveguide modes guidable by the other optical arm; providing at a second location an optical combiner device: configured to be able to interfere light from the first and second arms; and, in optical communication with a first and a second optical output path; outputting the signal and idler photon pair from the combiner device by either: bunching the signal and idler photon pair by outputting the said pair in one of optical output paths; or, anti-bunching the photon pair by outputting the signal photon in one output path and outputting the corresponding idler photon in the other optical output path.

The combiner device, splitter device and optical arms may each comprise integrated optical waveguides. More preferably, the integrated optical waveguides of the splitter, combiner and optical arms form an integrated interferometer where the splitter and combiner are physically connected to opposing ends of each arm.
Integrating the said splitter, combiner and arms provides phase stability to the interferometer by co-locating the said components on a single device or chip.

According to a fourth aspect of the invention there is provided a method for generating photons comprising the steps of: providing pump light; splitting the pump light, at a first location with an integrated optical splitter device, into separate first and second integrated optical arms; wherein each arm comprises a photon pair source separate from and substantially identical to the photon pair source of the other arm; converting at least one pump light photon into an signal and idler photon pair in a photon pair source of at least one of the integrated optical arms; the said at least one integrated optical arm being configured to guide pump, signal and idler optical waveguide modes that are indistinguishable from the respective pump, signal and idler optical waveguide modes guidable by the other integrated optical arm; providing at a second location an integrated optical combiner device: configured to be able to interfere light from the first and second arms; and, in optical communication with a first and a second optical output path; outputting the signal and idler photon pair from the combiner device by either: bunching the signal and idler photon pair by outputting the said pair in one of optical output paths; or, anti-bunching the photon pair by outputting the signal photon in one output path and outputting the corresponding idler photon in the other optical output path.

The following features may be combinable, where applicable with the third and fourth aspects of the invention, and may be combinable, where applicable, with the first or second aspect of the invention.

The method as described may comprise pump light with a coherence length, wherein the optical path length difference between the first and second optical paths is less than the pump light coherence length.

Preferably the optical path lengths of the first and second arms are substantially identical.

The method may comprise the step of: providing a phase relationship between the first and second arms, the phase relationship determining whether the combiner device bunches or anti-bunches the photon pair.

The phase relationship may be a phase difference, the method further comprising the step of: adjusting the optical path length of at least one of the arms to provide the phase difference between the first and second arms.

The method may further comprise the step of adjusting the phase difference using a phase shifter device.

One or both of the splitter device and combiner device may be integrated optical waveguide couplers.

The method may comprise the step of: coupling approximately 50% of the pump light into each of the first and second arms.

The combiner device may be a 2×2 optical coupler comprising an approximate 50/50 coupling ratio. The 2×2 coupler comprises two physically separate input waveguides and two physically separate output waveguides.

Each photon pair source may comprise an integrated optical waveguide, the method further comprising the step of generating the photon pair with one of the said integrated optical waveguides.

The method may convert at least one pump light photon into a signal and idler photon pair by: annihilating one or more pump light photons of the same wavelength and generating a signal photon and idler photon, each of the signal and idler photons comprising wavelengths that are different to the pump photons and to the corresponding photon.

The method may comprise the step of generating the photon pair using spontaneous four wave mixing.

The method may comprise the step of generating the photon pair by annihilating two pump photons.

The pump light may comprise two monochromatic light sources of different wavelengths, wherein converting at least one pump light photon into a signal and idler photon pair comprises: annihilating two pump light photons of different wavelengths and generating a signal photon and idler photon, each of the signal and idler photons comprising a wavelength that is identical to the corresponding photon of the pair and different to the pump photons.

The pump light may comprise two monochromatic light sources of different wavelengths, wherein converting at least one pump light photon into an signal and idler photon pair comprises: annihilating two pump light photons of different wavelengths and generating an signal photon and idler photon, each of the signal and idler photons comprising wavelengths that are different to the pump photons and to the corresponding photon of the pair.

BRIEF DESCRIPTION OF DRAWINGS

Embodiments of the present invention will now be described in detail with reference to the accompanying drawings, in which.

DETAILED DESCRIPTION

General Interferometer

An optical source 2 for producing photons and an associated method for producing photons by manipulating spatially entangled quantum states is presented.

The optical source 2 presented herein uses the principles of another phenomenon of quantum optics called quantum interference. In classical optics, interference typically takes place in an interferometer where an input light beam is split into two optical paths. The optical paths each carry a portion of the input light, and are recombined at a combiner device 14. The output of the combiner device 14 gives constructive and destructive interference when the light beams are coherently in phase or coherently out of phase with each other. The visibility of these interference fringes are maximised when the splitter 10 and combiner 14 devices have a 50/50 coupling ratio. Classical interference and hence the operation of a classical interferometer is therefore based on the principle of interfering two coherent beams, each beam containing multiple photons. Classical interferometers are often designed with non-identical optical paths, such as those described above for quantum cryptography, so that the photons propagating in the arms that arrive at the combiner device 14 are distinguishable from each other by having different optical properties, for example a different polarisation.

Quantum interference operates on a different principle and relies upon the two optical paths being substantially identical such that a photon arriving at a combiner device 14 from one path is indistinguishable, in every degree of freedom, from an equivalent photon arriving from the other path.

From a quantum mechanical viewpoint, it is not possible to determine, when recombining the optical paths at a 50/50 coupler, by which path the photon travelled. Therefore, the photon propagates along both paths with identical probability amplitudes. The splitter 10, creates a linear superposition state for each individual input photon, and the combiner 14, mixes the two states. The predicted output of such an interferometer using quantum theory is the same as classical theory when considering the probability of a single photon. However, when multiple photons are considered, the predictions of quantum theory have no equivalent in classical optics. When multiple photons are considered, quantum interference predicts the phenomena of bunching and anti-bunching, both of which are real phenomena. Classical optics cannot predict the anti-bunching effect because classical optics does not predict the behaviour of single photons.

Figure 1:
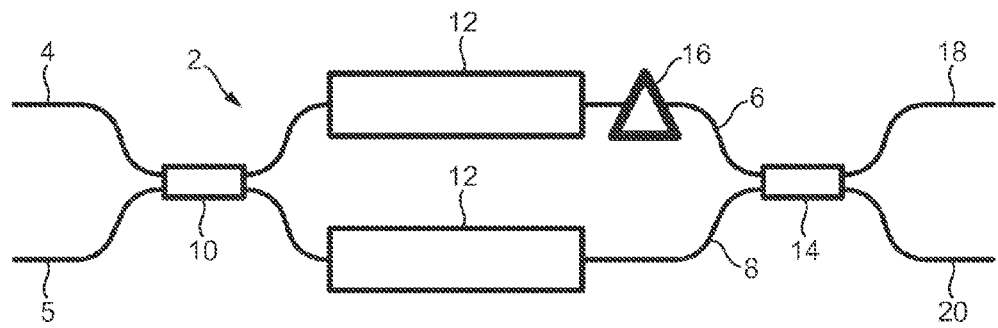
FIG. 1 is a plan view of an optical source comprising an interferometer.
Figure 2A:
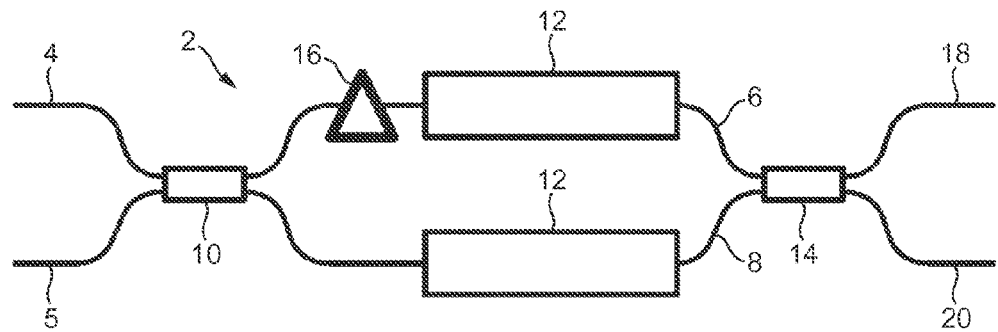
FIGS. 2a-2c are plan views of schematic diagrams of different optical sources.
Figure 2B:
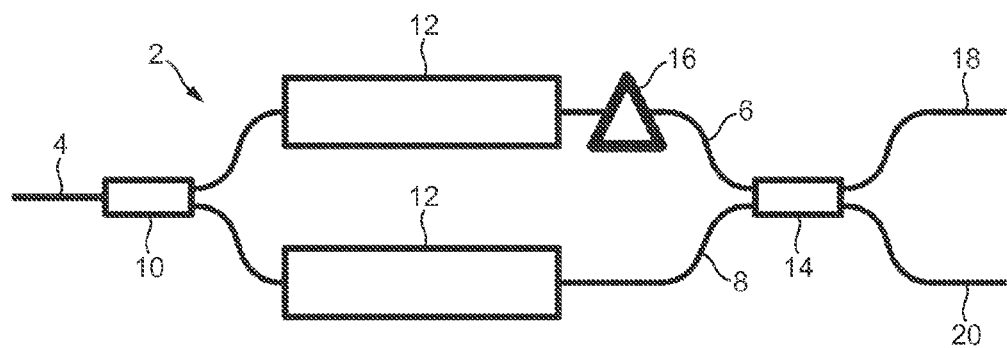
Figure 2C:
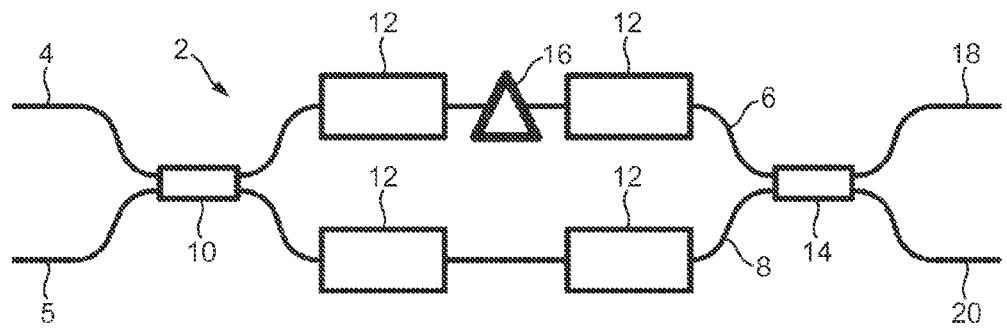

The optical source 2 presented herein comprises a Mach-Zehnder interferometer as shown schematically in FIG. 1. FIGS. 2a-2c show some alternative schematic examples of different Mach-Zehnder interferometers that can be used for an optical source 2 described herein. The interferometer comprises a splitter device 10 configured to split an incoming source 60 of pump light into at least two physically separate, substantially identical, interferometer arms 6, 8. The arms are separated to an extent that no significant evanescent optical coupling takes place between the arms. The interferometer arms 6, 8 comprise optical paths that are inputs to a combiner device 14. The output of the combiner 14 comprises at least two physically separate optical output channels 18, 20. The splitter 10 and combiner 14 are different devices. Each arm 6, 8 comprises one or a plurality of photon pair sources 12 for converting one or more input pump photons (the pump photons being annihilated) into signal and idler photons. The number of photon pair sources 12 in each arm 6, 8 is the same. Furthermore, each photon pair source 12 in each arm 6, 8 is substantially identical to an equivalent photon pair source 12 in the other arm/s. In other words, each arm 6, 8 contains identical photon pair sources 12 to the other arms 6, 8.

As stated above, the identical arms and identical photon pair sources in each of the said arms, provides identical probabilities of generating signal and idler pairs in each arm. This leads to the entangled state of there being a signal/idler pair in one or the other arm.

The interferometer may comprise one or more phase shifter devices 16 configured to produce a phase difference in the photons propagating in the interferometer arms 6, 8.

The arms 6, 8 and photon pair sources 12 are identical to the extent that a photon at the input to the combiner 14 is indistinguishable, in every degree of freedom, irrespective of which arm 6, 8 it took from the splitter 10 to get to the combiner 14, provided the path length difference between the arms 6, 8 does not exceed the coherence length of the pump source 60. From a classical optics viewpoint, the arms 6, 8 are identical to the extent that identical photons propagating along each arm 6, 8 arriving at the combiner 14, may coherently interfere but are otherwise indistinguishable from each other in every degree of freedom including, wavelength, polarisation, propagation constant, temporal shape of the wave-packet, and cross sectional modal profile.

The components of the interferometer, including the splitter 10, arms 6, 8, photon pair sources 12, combiner 14 and any input 4, 5 and/or output 18, 20 optical paths and any phase shifters 16 may be an assembly of optical components, for example bulk optic components connected by free space optical paths and/or optical fibre 69. Preferably the splitter 10, arms 6, 8, photon pair sources 12, combiner 14, any input 4, 5 and/or output 18, 20 optical paths and any phase shifters 16 are co-located on a single device 2 or platform such as a chip. The term chip, device 2 and interferometer are used throughout this application to describe the optical source 2, however it should be understood that optical sources presented herein are not in principle limited to devices and chips.

The chip may be, for example, a board where different components are hybrid integrated upon and/or monolithically grown into/upon the board. Preferably the interferometer is a monolithic device comprising integrated optical waveguide 28 circuitry and other waveguide 28 structures (such as couplers used for the splitter 10 and combiner 14) in the configuration of a Mach-Zehnder interferometer.

Figure 3:
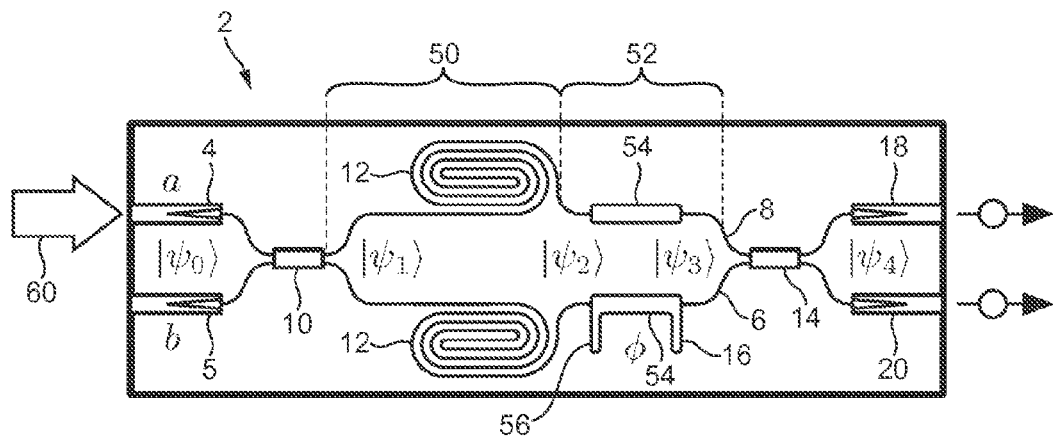
FIG. 3 is a plan view of a chip comprising the optical source.

Such an integrated optical waveguide device 2 is shown in FIG. 3 as a chip comprising a length of approximately 1 mm.

Circuit

The waveguide 28 circuitry comprises two input waveguides 4, 5, a first optical MMI (Multi-Mode Interference) coupler acting as a splitter 10, two identical length arms 6, 8 (also known arms A and B) a second MMI coupler acting as a combiner 14 and two output waveguides 18, 20. The first coupler connects and optically communicates with the two input waveguides 4, 5 and the two arms 6, 8. The second coupler connects and optically communicates with the two output waveguides 18, 20 and the two arms 6, 8. Both couplers in this example are 2×2 couplers comprising an approximate 50/50 (50%) coupling ratio±3%. The 3% error tolerance provides a ~99% interferometer fringe visibility. In principle, any coupling ratio may be used for the couplers however the further the splitter 10 and combiner 14 coupling ratios are from the ideal 50/50 ratio, the weaker the quantum interference effect. Preferably the coupling ratio does not increase to more than 70% or decrease to less than 30%.

From a classical optics viewpoint, the optical paths that photons may take as they propagate through the interferometer is firstly along one of the input waveguides 4, 5, then through the first coupler 10 into one of the arms 6, 8, exiting the arm 6, 8 and entering the second coupler 14 and then finally propagating through one of the output waveguides 18, 20 depending on any classical interference with coherent photons split into the other arm.

One arm 6, 8 comprises a thermo-optic phase shifter 16 configured to be able to locally change the temperature along at least part of the said arm 6, 8 when electric current is applied to the phase shifter 16. The induced temperature difference creates a local change in refractive index and hence a phase-change in the optical path of the said arm 6, 8.

The photon pair source 12 in each arm 6, 8 in the example shown in FIG. 3 is a serpentine circuit of the same waveguide 28 cross section and material used in the rest of the chip.

Any suitable $\chi^{(2)}$ or $\chi^{(3)}$ photon pair source 12 may be used in the arms 6, 8 including, but not limited to, monolithically integrated photon pair sources 12 or hybrid integrated photon pair sources 12. The photon pair sources 12 may comprise any suitable material or structure. Preferably the photon pair source 12 is an integrated optical waveguide 28. Other examples of photon pair sources 12 in the interferometer arms 6, 8 include: a waveguide 28 of the same core 30 material and cross sectional height as the nominal arm 6, 8, input 4, 5 and output 18, 20 chip waveguides, but a different width.

The arms 6, 8 comprise unamplified optical paths (i.e. the arms 6, 8 do not comprise any optical amplification device or amplification source along their respective optical paths) because any classical amplifying device (for example an SOA, EDFA, YDFA etc) would have a Poisson distribution on the number of photons added, therefore destroying the photon pair state generated.

Waveguides

The optical waveguide 28 circuitry of the arms 6, 8, input waveguides 4, 5 and output waveguides 18, 20 throughout the interferometer have a common core 30 material and a substantially rectangular waveguide 28 cross section. The waveguide may comprise: a core material comprise silicon, a surrounding cladding material comprising silica; a cross sectional waveguide width between 400 nm-700 nm and a cross sectional waveguide height between 100 nm-400 nm. Preferably the waveguide width is approximately 470 nm and the waveguide height of approximately 220 nm. These dimensions are given with a preferred tolerance of ±1 nm.

The MMI (splitter 10 and combiner 14) couplers in FIG. 3 also have the same height as the other waveguide 28 circuitry, but have a different cross sectional width to support the number of modes required in the MMI coupler and to allow for the required multimode interference of the coupler.

The waveguides are single mode for both TE and TM polarisations for the optical wavelengths typically used, e.g. 1530-1565 nm (optical communications C-band).

In principle, the device 2 may operate at any desired wavelength range provided the waveguides in the arms 6, 8 are single mode for the wavelengths used by the device 2. The waveguide 28 cross section may also comprise any shape or size that guides a single mode in the wavelength range of interest and is not limited to being rectangular.

Any types of waveguide 28 cross sectional geometry may be used including buried waveguides as described above, ridge waveguides or rib waveguides.

In principle any type of 2×2 optical coupler may be used including, but not limited to, an MMI coupler, star coupler or directional coupler. Furthermore the splitter 10 may be a 1×2 coupler such as a Y-branch as shown in FIG. 2c. In general, the splitter 10 may be any coupler with one or more input channels and two or more output channels, whilst the combiner 14 may be any coupler with two or more input channels and two or more output channels.

In principle, the optical source 2 may comprise any number of inputs 4, 5 and outputs from the splitter device 10. For example the splitter device 10 could be a 4×4 port MMI coupler. There may in principle be more than two arms 6, 8, for example four physically separate arms starting from the 4×4 splitter 10 and ending at combiner 14 with four input channels and at least two output channels 18, 20. For example the device 2 could comprise a 4×4 splitter 10, four arms 6, 8 and a 4×4 combiner 14.

Formation

Figure 4:
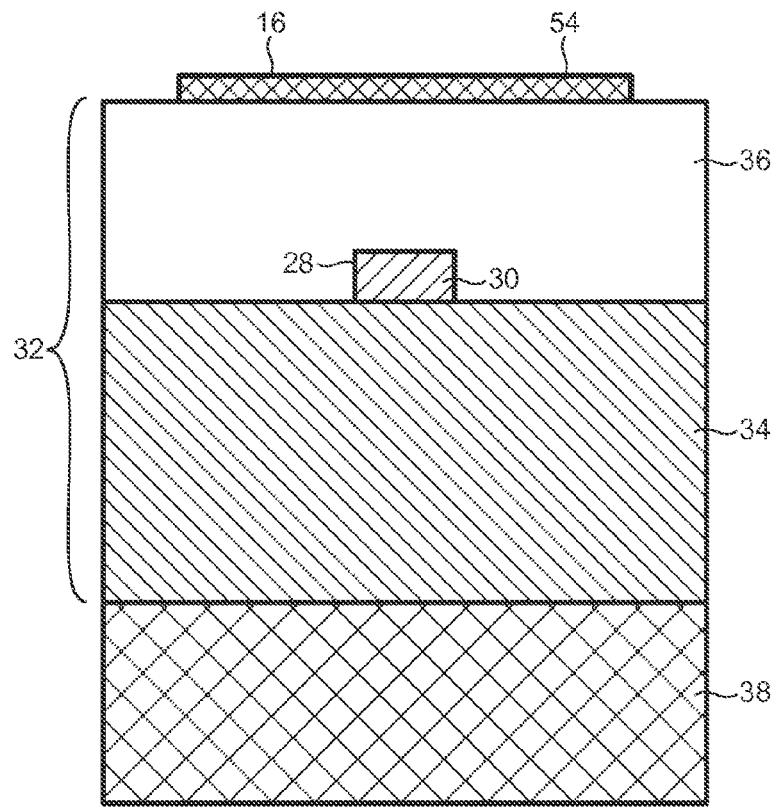
FIG. 4 is a cross section view through a waveguide and phase shifter device as provided in FIG. 3.

The waveguides 28 and couplers on the device 2 as shown in the example of FIGS. 3 and 4 are Silicon (Si) waveguides 28, buried in a cladding layer 32. The cladding layer 32 is made up of at least two cladding sub-layers 34, 36. The cladding layer 32 adjacently borders a Si substrate layer 38, wherein the first cladding sub layer 34 comprises Silicon Dioxide ($SiO_2$). The silicon waveguides 28 sitting upon the Silicon Dioxide ($SiO_2$) form a silicon-on-insulator (SOI) platform. The Si substrate layer 38 is typically a portion of a silicon wafer upon which the $SiO_2$ was grown. The first $SiO_2$ cladding sub-layer 34 is deposited upon the Si substrate 38 and/or otherwise grown into the Si substrate 38 (for example by thermal oxidation) to a depth of approximately 3000 nm±1 nm. The silicon waveguide 28 circuitry is then formed upon the first cladding sub-layer 34 by any suitable technique, for example using a standard SOI processing technique (an example of a suitable technique is disclosed in U.S. Pat. No. 7,892,951, the entire contents of which are incorporated herein by reference) together with lithographic patterning and etching. In the example shown in FIG. 4, the waveguides 28 and couplers are formed from a common Si waveguide core 30 layer.

The second cladding sub-layer 36 is then deposited over the Si waveguide core layer 30 to over-clad the silicon waveguides 28. The second cladding sub-layer 36 has a thickness extending above the Si waveguide core 30 of approximately 1 μm. The second cladding sub-layer 36 may comprise a single layer or multiple layers and may comprise $SiO_2$ and/or any other suitable cladding material such as a polymer. The first $SiO_2$ cladding sub-layer 34 therefore borders the cross sectional bottom edge of the waveguides 28 whilst the second cladding sub-layer 36 borders the cross sectional side and top edges of the waveguides 28.

For the purposes of the present description, unless otherwise stated, reference made to top, bottom and sides of the chip or waveguide 28 simply refer to the associated surfaces that in cross section have the top surface facing away from the Si substrate 38, the bottom surface being opposite to the top surface whilst the side surfaces adjoin the said top and bottom surfaces.

Each arm 6, 8 comprises a first waveguide section 50 adjoined to a second waveguide section 52. The sections 50, 52 in each arm 6, 8 are substantially identical to the corresponding sections in the other arm 6, 8 and comprise the same physical length, number of turns, radii of each turns, waveguide 28 cross section and core 30/cladding 32 materials such that any optical effects that could change the properties of a photon in a mode in one arm 6, 8 will be equally present in the other arm 6, 8. The waveguides 28 preferably differ in (plan-view) circuit position on the chip and are substantially symmetrical about a symmetry line running along the chip extending through the centre of the splitter 10 and combiner 14.

The first section 52 optically couples to one of the outputs of the splitter 10 and then follows an elongated path taking the form of a serpentine-like configuration in the plane of the Si waveguide core 30 layer as shown in FIG. 3. The serpentine configuration of each arm 6, 8 acts as a photon pair source 12 that converts pump photons to the signal and idler photons. In principle, however, any part of the first 50 and second 52 sections of the arm 6, 8 may comprise a photon pair source 12 for converting pump photons (by annihilating the pump photons) to signal and idler photons used in the quantum mechanical interference as described below.

The serpentine paths are substantially identical in planview and symmetric about the length of the chip. The first section 50 of each arm 6, 8 which comprises the (serpentine) photon pair source 12, comprises a longer optical path length than the second section 52.

The second section 52 of each arm 6, 8 comprises a straight length of waveguide 28. The second section 52 of waveguide 28 in one arm 6, 8 comprises the same length as the corresponding second section 52 of the other arm 6, 8. As shown in FIG. 3, both of the arms 6, 8 comprise a phase shifter 16 co-located, in plan, with the said straight length of the second section 52. The thermo-optic phase shifters 16 are formed from a metal layer or composite metal layer, or any other suitable conducting material of set of materials. The thermo-optic layer is formed upon the top surface of the cladding layer 32 and comprises an elongated strip 54 (or heating track) running directly over the top of the waveguide 28 arm, extending, in cross section, laterally proud of each of the side edges of the waveguide 28 as shown in FIG. 4. Both second sections 52 preferably comprise identical heat tracks 54 overlaying the waveguide 28 to ensure that any optical effects caused by the presence of the heat track 54 without any applied current (such as absorption of one polarisation, or stresses induced by the deposition of the metal) are duplicated in each arm 6, 8.

Each phase shifter 16 is configured to be able to induce at least a $\pi/2$ phase shift between the interferometer arms 6, 8. This is typically accomplished by choosing a length and width of heating track 54 sufficient to impart enough refractive index change over a sufficient length of waveguide 28 underneath the said track 54. The width of the heat track 54 is preferably between 10-30 μm wide, and more preferably approximately 20 μm wide. The length of the track is preferably 200 μm.

Preferably, at each end of one of the heat tracks 54 (hence on one of the arms 6, 8), as shown in FIG. 3, is a connection track 56 designed to carry current to the heating track 54. The connection tracks 56 connect to and run co-parallel and perpendicularly away from the length of the heat track 54 in the plane of the thermo-optic layer and terminate in contact pads (not shown) sized to facilitate a temporary or permanent connection to a voltage or current source, for example by wire bonding or by contact by electrical probes. Typically the connection tracks 56 and contact pads are formed in the same fabrication steps and comprise the same material/s and heating material layers as the heating tracks 54, but further comprise one or more patterned layers of another material, such as Au, deposited over the initially deposited heating material layer. The heating tracks 54 may be fabricated of any suitable material, preferably a metal or metal composite, for example NiCr.

In principle the second section 52 may comprise a non-straight or otherwise curved path upon which the heating track 54 is co-located. There may also be more than one phase shifter 16 on any one or both of the arms 6, 8. Any phase shifter 16 on any arm 6, 8 may be co-located upon the waveguide 28 in the first section 50. Furthermore, any of the phase shifters 16 may comprise one or more, connection tracks 56 or contact pads. The second section 52 may also be located before the first section 50 in the interferometer arm 6, 8 such that a photon exiting the splitter 10 passes through a second section 52 before the first section 50, thus passing through the phase shifting area before travelling through the photon pair source 12. Several different configurations of interferometer arms 6, 8 are shown in FIGS. 1 and 2a to 2c where the phase shifter 16 is located at different points along the arm 6, 8 including before, after or in between photon pair sources 12.

The phase shifter 16 is not limited to a thermo optic phase shifter 16 but may be any suitable phase shifter 16. Further examples of techniques to induce phase changes include: an electro-optic phase change (using the electro-optic effect) for example using a waveguide 28 comprising a $\chi^{(2)}$ material where a phase change is induced by applying strain to one or more strain layers (such as any of the core 30 or cladding 32 materials); carrier depletion or carrier injection modulation from using a PIN junction. Furthermore the phase shift between the arms 6, 8 may be achieved by using a combination of phase shifters 16 in a single arm 6, 8 or both arms 6, 8.

The cladding layer 32 may in principle be any thickness or combination of thicknesses and formed from any number of sub-layers 34, 36 to give rise to any desired waveguide 28 cross section as described herein.

In principle, any suitable waveguide 28, cladding 32 or substrate materials 38 may be used to form the waveguides 28, for example the cladding layers may comprise silica and/or polymer. Preferably the waveguide core 30 material comprises a nonlinear elastic $\chi^{(2)}$ or $\chi^{(3)}$ susceptibility such as, but not limited to Si, GaN, GaAs, InP, AlN, $SiO_2$, $LiNO_3$. More preferably, the core 30 material comprises a high $\chi^{(3)}$ susceptibility to increase the rate of generation of photon pairs.

The core 30 material also preferably has a refractive index in the C-band wavelength region of 3 or more to support a strongly confined single mode (given cladding 32 refractive indices between 1-1.5). The more strongly guided the mode is the stronger is the pump field per unit area cross section of the core 30 and therefore the greater the conversion efficiency since SFWM has a quadratic conversion dependence with optical power/unit area.

Stronger guided modes have substantially lossless bend radii that are smaller than weakly guided modes. The stronger modal confinement therefore allows for both a shorter length of photon pair source 12 waveguide and a more compact circuit design. This leads to more compact interferometers, therefore smaller chips sizes.

Silicon is used as an example in this application because it has a refractive index in the C-band of approximately 3.5, has a high $\chi^{(3)}$ susceptibility and is readily available.

The first section 50 may in principle have any suitable longitudinal waveguide 28 circuit design and is not limited to a serpentine configuration.

The device 2 may also be made using any suitable fabrication process or combination of processes.

Coupling

The input 4, 5 and output 18, 20 waveguides each have a waveguide coupling facet (not shown) at a side edge of the chip. The output waveguide facets share a common side edge that is opposite to the side edge shared by the input waveguides 4, 5. The portion of the input 4, 5 and output waveguides 18, 20, local to and adjoining the said facet side edge have a propagation direction substantially perpendicular to the said side edge. The said local portion preferably comprises a spot size converter to aid coupling and reduce insertion losses to and from the integrated optical waveguides 28.

Operation

The optical sources 2 presented herein, as exemplified by the chip shown in FIG. 3, are configured to receiving input pump photons from a pump source 60. The pump source 60 may have a pulsed or continuous wave (CW) output.

Figure 5A:
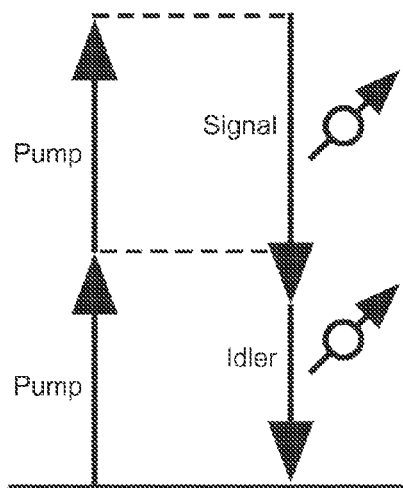
FIG. 5 is a schematic diagram showing the photon transitions and energy levels of degenerate and non-degenerate SFWM.
Figure 5B:
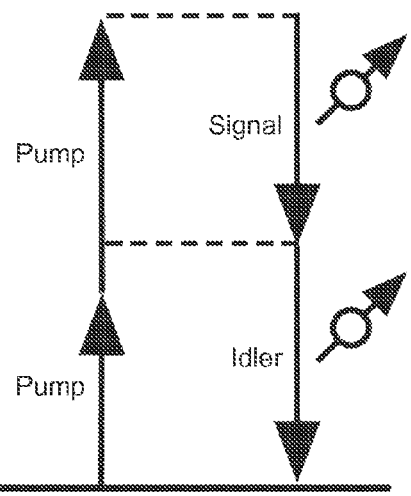

When using photon pair sources 12 using the $\chi^{(3)}$ susceptibility, for example SFWM, the optical source 2 may be operated in a degenerate mode or a non-degenerate mode. FIGS. 5a and 5b show schematic energy level diagrams corresponding to the non-degenerate and degenerate modes respectively. The lengths of the arrows in FIGS. 5a and 5b are proportional to the energy transitions (hence photon frequency) in converting the pump photons to the signal/idler photons.

The pump photons in the non-degenerate mode are of the same wavelength and energy whilst the signal and idler photons are wavelength distinguishable. The signal photons have a higher energy than the pump photons (hence a higher frequency and a shorter wavelength); whilst the idler photons have a lower energy (hence a lower frequency, and a longer wavelength) than the pump photons. The signal and idler photons are therefore spaced apart spectrally either side of the pump wavelength. Alternatively, a non-degenerate mode of operation can be used whereby two pump photons of different wavelengths are annihilated to produce a signal/idler pair wherein each photon of the pair has a different wavelength to the other photon of the pair and the pump wavelengths.

The degenerate mode of operation requires two pump photons of different wavelengths, hence different energies. The signal and idler photons, converted from the annihilated pump photons, are an indistinguishable pair comprising identical energies that together add up to the energies of the two pump photons in the conversion. Typically two different pump sources 60, 62 are required to generate the pump photons in this mode. These pump sources 60, 62 may be multiplexed into one input 4, 5 into the splitter 10 or may be received separately by different splitter inputs, 4, 5. In the non-degenerate mode, only one pump source 60 may be required in principle.

In principle any polarisation of pump light may be input to the device 2.

When operating in the non-degenerate mode with a single pump wavelength, the pump light may be injected in any polarisation, and produce signal-idler pairs in that same polarisation.

When operating in the non-degenerate mode with two different pump wavelengths, the pump wavelengths may be injected co-polarised, in which case the signal-idler pair produced shares that polarisation. Alternatively the pump wavelengths may be injected orthogonally-polarised, in which case the signal-idler pair shares those polarisations in either configuration of signal and idler (i.e. the signal is vertically polarised and idler is horizontally polarised, or vice versa). This sharing of orthogonal polarisations by the signal/idler pair only occurs if the dispersion between the four optical frequencies (two pump wavelengths, signal and idler wavelengths) is small, which is enhanced by short inter-action regions, and closely spaced optical frequencies.

Preferably the pump photons are co-polarised TE (electric field parallel to the major plane of the device) polarisations for both degenerate and non-degenerate SFWM. This is because TE light typically suffers less scattering losses than TM light (electric field perpendicular to the major plane of the device), due to the typical side-wall roughness of integrated optic waveguides that results from the fabrication process.

From a classical optics point of view, the pump photons enter the splitter 10 and are either coupled into the first arm 6 or the second arm 8. The pump photons then pass through the photon-pair sources 12 and arrive at the combiner 14. As pump photons pass through the arms 6, 8 of the interferometer, some of the pump photons are converted into pairs of signal and idler photons. Typically the conversion efficiency of converting pump photons to signal/idler pairs for a straight waveguide photon pair source of a length of ~6 mm has a pair generation rate of 3000 pairs per mW$^2$. The newly generated signal/idler photons also travel along the same interferometer path to the combiner 14 as the pump photons. This may be for example the same waveguide 28 path.

The pump power should be high enough to achieve the wanted pair generation rate but low enough to ease the filtering of any out of band noise as described below. Preferably, values of pump power propagating along the input waveguides 4, 5 of the interferometer are in the order of 1-10 mW, preferably 1-5 mW.

The photon pair sources 12 output a spectrum of signal/idler photons whose energies add up to the energy of one pump photon (for a photon pair source 12 using the $\chi^{(2)}$ susceptibility) or two pump photons (for a photon pair source 12 using the $\chi^{(3)}$ susceptibility).

Figure 6:
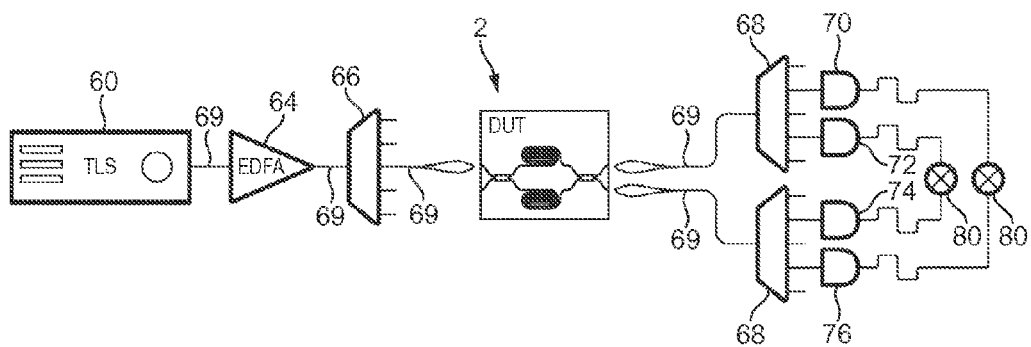
FIG. 6 is an assembly of components configured to generate, and monitor the generation of, photons using non-degenerate SFWM.
Figure 8:
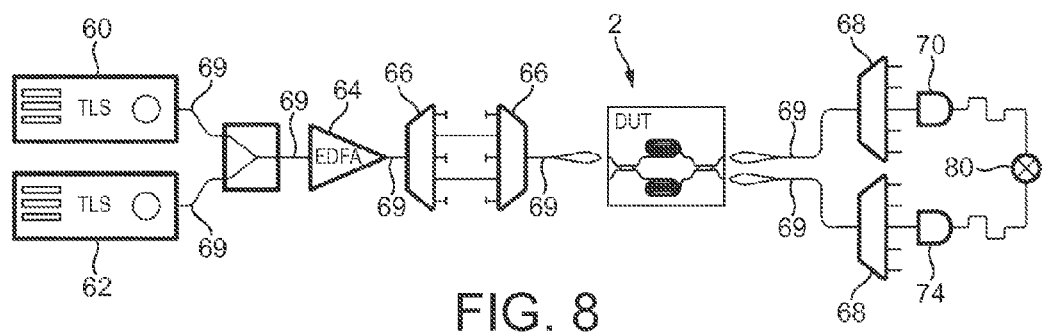
FIG. 8 is an assembly of components configured to generate, and monitor the generation of, photons using degenerate SFWM.

In the example shown in FIG. 3, a serpentine circuit of the silicon waveguide 28 used for the arms 6, 8, input 4, 5 and output 18, 20 waveguides, is used for the primary photon pair sources 12. In other words, the example of FIG. 3 uses the serpentine length of each arm 6, 8 as the primary photon pair source 12, however other (i.e. non serpentine) lengths of the arm 6, 8 may also contribute to the generation of photon pairs. This waveguide uses the SFWM ($\chi^{(3)}$ nonlinearity) for the photon pair conversion. One or more optical filters 68 are used after the combiner 14 device to select signal and idler photons with the correct wavelengths. One or more filters 68 are also used to remove or isolate the pump photons after the combiner 14. Preferably, and as shown in FIGS. 6 and 8, the filters 68 used to select, or pass, the signal/idler photons are also used to filter out, or isolate, any pump photons that exit the combiner 14 device that have not been converted. Where the interferometer source 2 is a chip, typically these filters 68 are located external to the chip as shown in FIGS. 6 and 8. In principle however, such filters 68 may be integrated onto the same chip as the interferometer.

After the signal/idler pair is generated, it exists in a superposition state denoted by the symbol $|\psi_x\rangle$ in standard Dirac notation where the subscript 'x' denotes the stage of evolution of the superposition state of the optical mode through the interferometer as shown in FIG. 3. Once the pair passes through the two arms 6, 8, it is then interfered at the combiner 14. The optical mode propagating in the top interferometer path (comprising top input waveguide 4, top arm 6 and top output waveguide 18) is denoted 'a' whilst the optical mode propagating the bottom interferometer 8 path (comprising bottom input guide 5, bottom arm 8 and bottom output guide 20) is denoted 'b'.

The equations 2-6 below describe the evolution of the superposition state from the initial bright light coherent state 'α' in path 'a', through the interferometer shown in FIG. 3, given a phase change imparted on the photons by the phase shifter 16 on the bottom arm 8. The phase shifter 16 imparts a phase change of $\phi$ to the pump photons, which is typically a Poissonian pump field, whilst the bi-photon state of the signal/idler photons accrues a $2\phi$ quantum phase denoted below in Equation 1.

$$\frac{|20\rangle - e^{i2\phi}|02\rangle}{\sqrt{2}}. \qquad \text{Equation 1}$$

The following notation applies in the equations 2-6 below: a, b denote respectively top optical mode path 'a' and bottom optical mode path 'b', while 's' and 'i' denote respectively signal and idler wavelengths; γ denotes conversion efficiency.

$$|\psi_0\rangle = |\alpha\rangle_a \qquad \text{Equations 2-6}$$

$$|\psi_1\rangle = \left|\frac{\alpha}{\sqrt{2}}\right\rangle_a \left|i\frac{\alpha}{\sqrt{2}}\right\rangle_b$$

$$|\psi_2\rangle = \left[1 + \gamma \frac{\alpha^2}{2}(|1_s1_i\rangle_a|0_s0_i\rangle_b - |0_s0_i\rangle_a|1_s1_i\rangle_b)\right]$$

$$\left|\frac{\alpha}{\sqrt{2}}\right\rangle_a \left|i\frac{\alpha}{\sqrt{2}}\right\rangle_b$$

$$|\psi_3\rangle = \left[1 + \gamma \frac{\alpha^2}{2}(|1_s1_i\rangle_a|0_s0_i\rangle_b - e^{i2\phi}|0_s0_i\rangle_a|1_s1_i\rangle_b)\right]$$

$$\left|\frac{\alpha}{\sqrt{2}}\right\rangle_a \left|ie^{i\phi}\frac{\alpha}{\sqrt{2}}\right\rangle_b$$

$$|\psi_4\rangle = \left[1 + \gamma \frac{\alpha^2}{2} e^{i\phi}[\cos\phi(|1_s1_i\rangle_a|0_s0_i\rangle_b - |0_s0_i\rangle_a|1_s1_i\rangle_b) + \sin\phi(|0_s1_i\rangle_a|1_s0_i\rangle_b + |1_s0_i\rangle_a|0_s1_i\rangle_b)]\right]$$

$$\left|\alpha\sin\frac{\phi}{2}\right\rangle_a \left|\alpha\cos\frac{\phi}{2}\right\rangle_b$$

By changing the phase φ from 0 to π/2 for the pump photons between the two arms 6, 8 using the phase shifter 16 (hence a 0 to π quantum phase for the bi-photon state), the interferometer can be tuned to output bunched photons or anti-bunched photons at the output ($|\psi_4\rangle$). The phase shifter 16 in principle may also be tuned to induce phase differences greater or less than π/2.

When the interferometer is tuned to bunch the signal and idler photons, both the signal and idler photons exit the same output channel 18, 20 of the interferometer. This may be either being output from the top output waveguide 18 in the example of FIG. 3 or the bottom output waveguide 20 in FIG. 3.

When the interferometer is tuned to anti-bunch, the signal and idler photons are split between the two output ports 18, 20. The signal exits one output channel, whilst the idler exits the other. This may be, for example in FIG. 3, the idler photon exiting the top output waveguide 18 whilst the signal photon exits the bottom output waveguide 20, or vice versa.

Because of the quantum superposition state generated by the interferometer, it is impossible to distinguish at the combiner 14 whether the signal/idler pair was generated in the top interferometer arm 6 or the bottom interferometer arm 8, hence optical path entanglement. Therefore both output channel possibilities described above, for each state (bunched or anti-bunched), are included in the mathematical notation.

Figure 7:
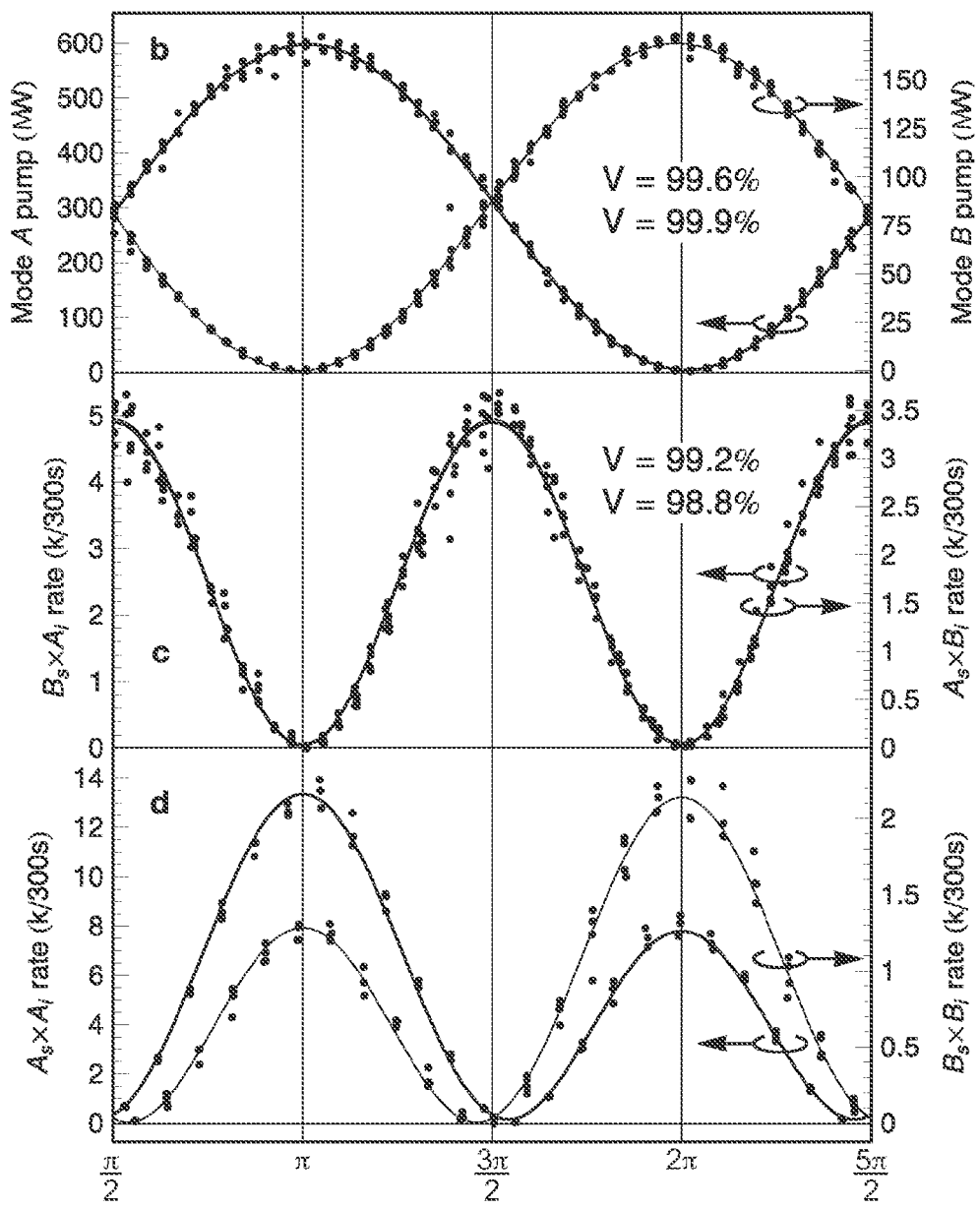
FIG. 7 shows experimental results corresponding to the set-up of FIG. 6.

The bunching and anti-bunching effects of the pairs interfering at the combiner 14, are not the result of interference of separate bright light coherent states arriving from different optical paths as predicted by classical optics. The un-annihilated pump photons exiting the combiner 14 exhibit standard interference fringe patterns predicted by classical optics, for example as shown in the top graph of FIG. 7 which shows pump photon interference. The results in FIG. 7 are discussed in more detail below.

The bunching and anti-bunching effects of the pairs interfering at the combiner 14, is a result of quantum interference. This effect interferes the probabilities of the signal/idler photon pairs being routed to each output. As-well as anti-bunching phenomena, the effects of quantum mechanical interference can also be seen in the periodicity of the interference fringes of the signal/idler photon output from the combiner 14. These interference fringes are phase doubled two-photon fringes due to the 2φ quantum phase accrued by the signal/idler pair when the phase shifter 16 imparts only a φ phase change to the pump photons.

For the degenerate mode of operation where wavelength indistinguishable signal and idler photons are generated, $|\psi_4\rangle$ is denoted by the equations 7-8 below for the bunched and anti-bunched conditions. The anti-bunched condition in equation 8 has $|\psi_4\rangle$ denoted as $|\psi_{split}\rangle$.

$$|\Psi_{bunch}\rangle = \frac{1}{\sqrt{2}}(|20\rangle - |02\rangle) \quad \text{for } \phi = 0 \qquad \text{Equations 7-8}$$

$$|\Psi_{split}\rangle = i|11\rangle \quad \text{for } \phi = \frac{\pi}{2}$$

When an arbitrary phase, for example a phase difference between 0 and π/2, is imparted by the phase shifter, $|\psi_4\rangle$ is a linear combination of these states denoted by equation 9.

$$|\Psi_{out}\rangle = \cos\phi|\Psi_{bunch}\rangle + \sin\phi|\Psi_{split}\rangle \qquad \text{Equation 9}$$

For the non-degenerate mode of operation where wavelength distinguishable signal and idler photons are generated, $|\psi_4\rangle$ is denoted by equations 10 and 11 below for the bunched and anti-bunched conditions. Again, the anti-bunched condition in equation 10 has $|\psi_4\rangle$ denoted as $\psi_{split}$.

$$|\Psi_{bunch}\rangle = \frac{1}{\sqrt{2}}(|1_s1_i\rangle_A|0_s0_i\rangle_B - |0_s0_i\rangle_A|1_s1_i\rangle_B) \qquad \text{Equation 10-11}$$

$$|\Psi_{split}\rangle = \frac{i}{\sqrt{2}}(|1_s0_i\rangle_A|0_s1_i\rangle_B + |0_s1_i\rangle_A|1_s0_i\rangle_B)$$

Therefore the optical source 2 as presented may output both signal and idler photons bunched in the same optical output channel 18, 20 or anti-bunched (split) signal and idler photons output in different optical output channels 18, 20 by changing the phase relationship between the interferometer arms 6, 8.

The said device 2, in bunched mode, therefore provides both correlated signal and idler photons from the same photon pair source 12 in the same output waveguide 18, 20, which is desirable in certain quantum metrology applications. Furthermore, by applying a suitable phase shift, the same device 2 may be tuned to output anti-bunched correlated photons, which can be desirable in quantum cryptography applications.

Non-Degenerate

An experimental setup to generate and monitor bunched and anti-bunched signal idler photon pairs with the device of FIG. 3 in the non-degenerate state is shown in FIG. 6.

An external source 60 of pump photons is input to the device.

The pump photons were generated from a continuous wave (CW) monochromatic laser source 60 at a wavelength of approximately 1549.6 nm±0.5 nm and amplified using an Erbium Doped Fibre Amplifier (EDFA) 64.

The output of the amplifier 64 was passed, via single mode optical fibre 69, through an arrayed waveguide grating (AWG) filter 66 to substantially isolate photons at the CW pump wavelength and substantially remove any photons at wavelengths other than the pump wavelength, such as those generated by EDFA 64 amplified spontaneous emission (ASE). The isolated pump photons at the CW wavelength were then input to one of the input waveguides 4, 5 of the device 2 using a lens ended optical fibre 69.

Each of the two output waveguides 18, 20 of the device 2 were coupled to separate lens ended optical fibres (or 'output fibres') 69.

Each separate output fibre 69 was connected to a wavelength de-multiplexer 68 to separate the pump photons, idler photons and signal photons into different output channels. In this example the de-multiplexer 68 used was an AWG, however any suitable wavelength de-multiplexer 68 may be used. The wavelength de-multiplexers 68 comprised a substantially identical set of output channel pass-bands. The wavelength de-multiplexer 68 outputs for the signal and idler photons were selected so that the signal and idler photons measured by the detectors 70, 72, 74, 76 were spectrally spaced apart by approximately 6.4 nm (800 GHz).

Each of the separate signal and idler wavelength channels output from each of the wavelength de-multiplexers 68 was input into a separate single photon detector 70, 72, 74, 76 as shown in FIG. 6, namely a signal photon detector 70 for the top (first) interferometer output 18; an idler photon detector 72 for the top (first) interferometer output 18; a signal photon detector 74 for the bottom (second) interferometer output 20; an idler photon detector 76 for the bottom (second) interferometer output 20. The detectors 70, 72, 74, 76 were each configured to electronically output a 'count' each time a photon was detected.

The output electronic detector counts are monitored together by electronic comparator (time interval analyser) devices 80 that compared when signal/idler photons exiting from different output waveguides 18, 20 are detected at the detector 70, 72, 74, 76, thus indicating whether the photons are bunched or anti-bunched. The time interval analyser keeps track of the coincidental events happening between two detector channels as a function of the time difference in the arrival time between the two detector channels. The arrival time of the different detected photons was different because of the different optical path lengths between the outputs 18, 20 and the detectors and the different electronic path lengths from the detectors to the time interval analyser.

The electronic comparators 80 in FIG. 6 are set to monitor the anti-bunching of photons, however they may be electronically connected to different detectors 70, 72, 74, 76, if required, to detect the bunched photons. Alternatively the bunching of signal/idler photons may be determined by comparing only single counts in both comparators 80 arriving from detectors 70, 72, 74, 76 allocated to a single output channel 18, 20.

A 'bunch' pair count was made when photons were detected simultaneously at:
a) both the signal and idler detectors 70, 72 in optical communication with the (top) output waveguide 18; or
b) both the signal and idler detectors 74, 76 in optical communication with the (bottom) output waveguide 20.

An anti-bunch pair count was made when photons were detected simultaneously at:
c) both the signal detector 70 in optical communication with the (top) output waveguide 18 and the idler 76 detector in optical communication of the (bottom) output waveguide 20; or
d) both the idler detector 72 in optical communication with the first (top) output waveguide 18 and the signal detector 74 in optical communication of the (bottom) output waveguide 20.

A noise count was made when a photon was simultaneously detected by all four detectors 70, 72, 74, 76. This corresponded to the situation where a photon pair was generated substantially at the same time by both arms 6, 8 or two photon pairs were generated in the same arm.

At the levels of pump power propagating along the arms, the chances of generating a noise count were negligible. This was also facilitated by running the source with a CW pump so that the pump power was distributed evenly in time so that the chances of the aforesaid co-generation of signal/idler photons was minimised. This is opposed to running the source with pulsed pump light where a high intensity pulse leads to grater probability of generating multiple signal/idler pairs at the same time.

Results

FIG. 7 shows three separate graphs, a top, middle and bottom graph, corresponding to the non-degenerate operation of the interferometer exemplified in FIG. 3.

The x-axis is common for all three graphs and indicates the phase difference imparted by the phase shifter 16 in divisions of π/2.

The top graph plots the pump power output from the different output waveguides 18, 20 of the device 2. The pump power from each output was measured by a further detector (not shown) in optical communication with the output of the wavelength de-multiplexer 68 corresponding to the pump wavelength. The left hand Y-axis of the top graph has units of detected optical pump power for the top output waveguide 18 in FIG. 3 whilst the right hand Y-axis of the top graph has units of detected optical pump power for the bottom output waveguide 20 in FIG. 3. Both Y axes have been normalised on the graph so that the interference fringes may be visibly compared. As expected by classical optics, the interference fringes of the output pump power, (resulting from the coherent interference of multiple photons split between two paths) have maxima and minima occurring every 2π radians of imparted phase difference.

The middle graph shows the rate of anti-bunch pair counts where the left hand axis denotes pair counts corresponding to a signal photon in the bottom guide 20 and an idler photon in the top guide 18; and the right hand axis denotes pair counts corresponding to an idler photon in the bottom guide 20 and a signal photon in the top guide 18. Both Y axes are normalised on the graph. The interference fringes of both anti-bunch pair counts, as predicted by quantum interference, have substantially overlapping maxima occurring every π radians of imparted phase difference due to the phase doubling described above.

The bottom graph shows the rate of bunch pair counts where the left hand axis denotes pair counts corresponding to a signal and idler photon in the top output guide 18; and the right hand axis denotes pair counts corresponding to a signal and idler photon in the bottom output guide 20. Both Y axes are normalised on the graph. The interference fringes of both bunch pair counts, as predicted by quantum interference, have substantially overlapping maxima occurring every π radians of imparted phase difference due to the phase doubling described above. The asymmetry in height of the fringe maxima results from unintended photon pairs being generated in the input 4, 5 and output 18, 20 waveguides, which in the device 2 tested, comprised the same cross section and core/cladding materials as the photon pair source 12.

As shown in the middle and bottom graphs, the anti-bunch maxima occurs at the same phase change as the bunch minima, thus demonstrating the ability of the device 2 to tune between bunch and anti-bunch modes of operation.

Degenerate

An experimental setup to generate and monitor bunched and anti-bunched signal idler photon pairs with the device 2 of FIG. 3, in the degenerate state, is shown in FIG. 8.

The experimental set-up is substantially the same as for the non-degenerate set-up as described above, however two pump sources 60, 62 were multiplexed into a single optical fibre, amplified by an EDFA 64 and subsequently filtered using two optical filters 66 to remove unwanted EDFA 64 ASE noise. In principle any number of optical filters 66 could be used to filter unwanted ASE noise, and any number of optical amplifiers 64 may be used.

The pump sources 60, 62 were CW lasers comprising monochromatic output wavelengths of approximately 1538.65 nm and 1560.97 nm. The wavelengths were chosen so that degenerate photon pairs could be generated in the device at 1549.60 nm.

The combined pump wavelengths were input into the top input waveguide 4 of the device 2. Alternatively the optical wavelengths could be input into different input waveguides 4, 5 of the device 2.

Since both the signal and idler wavelengths of the photon pair created in the interferometer arms 6, 8 were identical, only one output detector 70, 74 per output waveguide 18, 20 was required to detect the photons after the pump photons had been filtered out by the output wavelength de-multiplexers 68.

Figure 9:
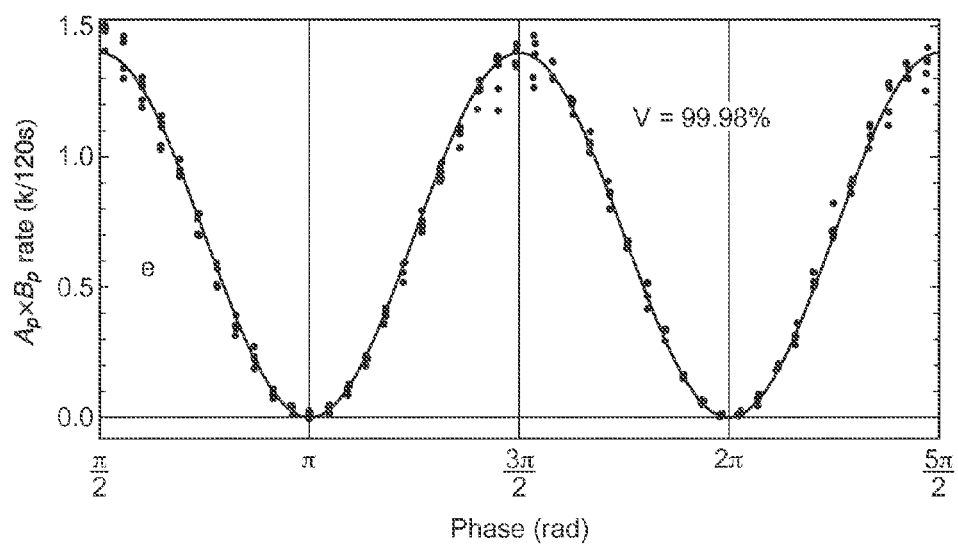
FIG. 9 shows experimental results corresponding to the set-up of FIG. 8.

FIG. 9 shows a set of results of the experimental set-up of FIG. 8. The results again show the presence of quantum phase doubling similar to the middle graph of FIG. 7.

The experimental set-ups and components thereof in FIGS. 6 and 8 as described above, may be varied in any suitable way. For example, any optical transmission may be used between components of the set-up including using integrated optical components. Any of the pump sources 60, 62, optical amplifier 64 and filters/de-multiplexers 66, 68, detectors 70, 72, 74, 76 and electronic monitoring devices 80 may be integrated with the interferometer onto a monolithic or hybrid integrated chip.

The pump sources 60, 62 may output any desired wavelength and may be CW or pulsed. The pre-filter 66 and optionally the optical amplifier 64 may be removed, for example if the pump source 60, 62 comprised an output of 20 mW and a side mode suppression ratio of 140 dB.

Preferably the input light to the device has a spectral out of band extinction ratio of greater than 50 dB, more preferably greater than 90 dB.

Any optical coupling technique or feature may be used to couple light into/out of the interferometer.

The input 4, 5 and output 18, 20 waveguides may comprise any of a different cross section or different waveguide 28 type or comprise one or more different cladding materials 32 surrounding one or more cross sectional edges of the said waveguide 28; and/or different core 30 materials. For example, input 4, 5 and output 18, 20 waveguides with a wider core 30 cross section than the photon pair source 12 waveguide could be used to reduce unwanted photons generated in the input 4, 5 and output 18, 20 waveguides.

Other components may also be used including, for example polarisation controllers.

Variations

Figure 10:
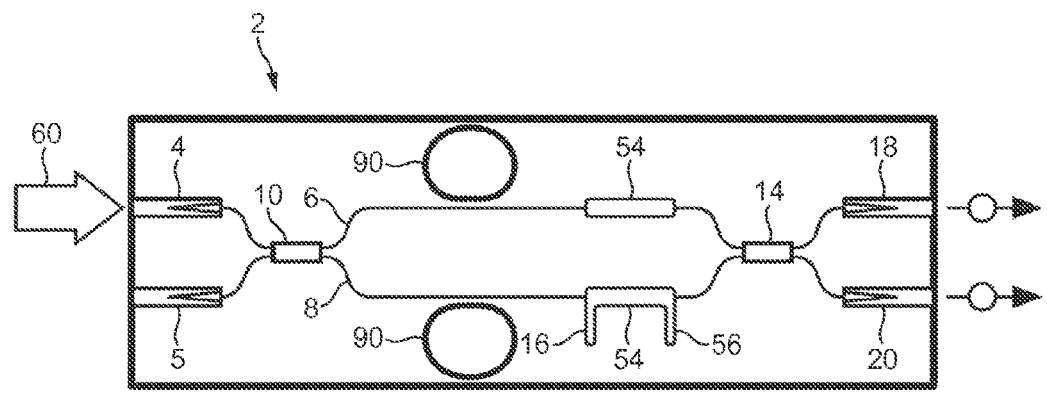
FIG. 10 shows an alternative source comprising a ring resonator coupled to each arm.

FIG. 10 shows an alternative interferometer arrangement where the photon pair source 12 on each arm 6, 8 is a ring resonator 90 (sometimes known as micro-ring resonator). Each ring resonator 90 is substantially identical in path length, waveguide geometry and waveguide materials (hence modal propagation constant) such that the resonant modes supported by one ring 90 coupled to one arm 6, 8 are indistinguishable from the modes supported by the ring 90 in the other arm 6, 8. Each ring resonator 90, in FIG. 10, is optically coupled evanescently with the waveguide arm 6, 8 optically connecting the splitter 10 and combiner 14. In principle, the coupling between the arm 6, 8 and the ring 90 may be any strength (% coupling), and may be at the critical coupling value. The critical coupling value is the coupling value at which, there is maximal energy transfer between the arm 6, 8 and the resonator such that the coupler reflectivity (corresponding to the % of the light not coupled across the coupler, i.e. staying in the arm 6, 8, or staying in the resonator) is the same as the round trip loss of the ring 90. Preferably the coupling is over coupled from the critical coupling value (increasing, beyond the critical coupling value, the % of light coupled across the coupler from the arm to the resonator or vice versa) to increase the probability that both signal and idler photons are coupled out of the resonator and not lost through scattering or absorption by the resonator.

The ring resonator 90 comprises a closed waveguide 28 loop forming a circular, elliptical or any other loop configuration in the plane of the waveguide 28 layer. Preferably this loop is formed during the same processing steps used to form the waveguide 28 core 30 layer of the interferometer.

Figure 11:
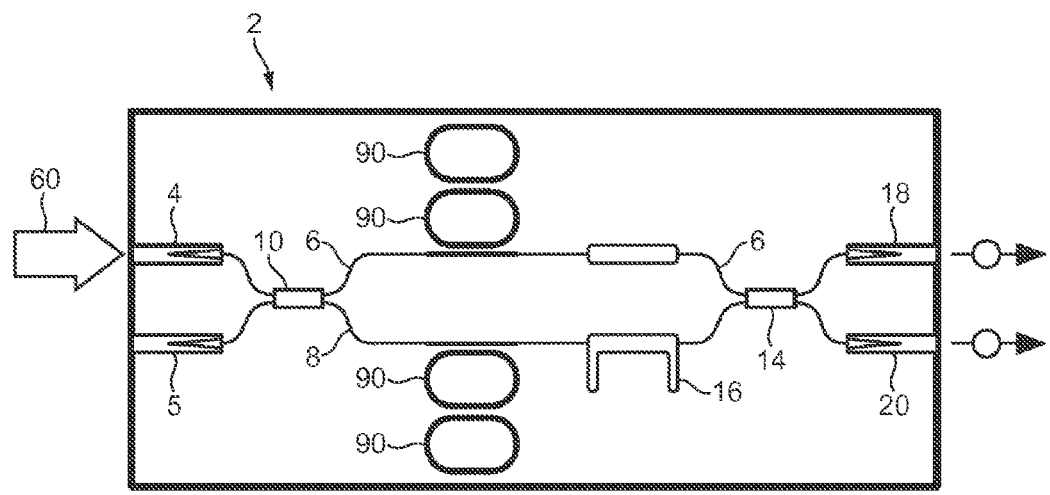
FIG. 11 shows an alternative source comprising two ring resonators coupled to each arm.

The resonator preferably comprises a bend radius that is substantially lossless and comprises an optical path length with resonant peaks spaced by a free spectral range dependant on the overall loop length. Preferably the ring resonator waveguide may have a substantially lossless bend radius of 5 μm. The pump wavelength is tuned to match one of the ring resonances while the signal and idler photon pairs are generated in side resonances. In principle, each arm 6, 8 may comprise a plurality of ring resonator photon pair sources 12. As shown in FIG. 11, any ring 90 on each arm 6, 8 may be directly optically coupled to another ring 90 on the same arm, 6, 8, thus creating a coupled resonance. Any one or more of the coupled rings 90 may be coupled only to one or more other rings 90. Preferably only one ring 90 associated with an arm 6, 8 is optically coupled to the arm 6, 8, whilst any other rings 90 associated with the same am 6,8 are coupled to one or more other rings 90. Where an arm 6, 8 comprises a plurality or 'set' of rings 90, the other waveguide arm 6, 8 comprises a substantially identical 'set' comprising substantially identical optical couplings.

Figure 12:
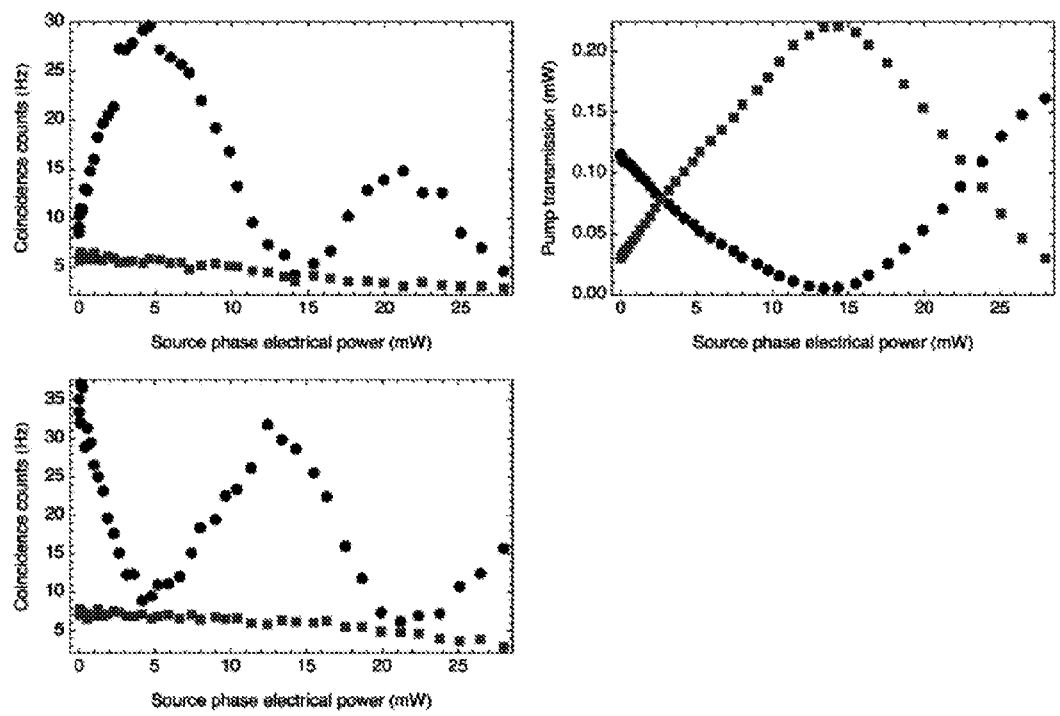
FIG. 12 shows experimental results corresponding to a device shown in FIG. 10.

FIG. 12 shows some experimental results for a source 2 similar to the device shown in FIG. 10. CW Light from a single laser source 60 was coupled into one of the input waveguides 4, 5. The experimental set-up was similar to the non-degenerate experimental set-up described above and shown in FIG. 6. The pump light power was low enough such that only one signal/idler pair was likely to be produced at a particular time in one of the interferometer arms. The output coincidence counts were monitored as the electrical power through the thermo-optic phase shifter was increased from 0 to 30 mW (increasing the electrical power changed the phase relationship between the arms of the interferometer).

The top left hand graph in FIG. 12 shows circles representing photon pair antibunching coincidence counts, with respect to phase shifter electrical power. The bottom left hand graph in FIG. 12 shows circles representing photon pair bunching coincidence counts, with respect to phase shifter electrical power. The right hand side graph shows circles and squares depicting the transmission of the pump laser light from the outputs 18 and 20, with respect to phase shifter electrical power. The square points in the left hand side graphs corresponded to noise counts described above.

As expected, the bunching coincidence counts were at a maximum when the antibunching coincidence counts were at a minimum and vice versa. Also, the periodicity of the bunching/antibunching peaks and troughs were twice that of the pump light due the bi-photon state of the signal/idler photons accruing a $2\phi$ quantum phase when a $\phi$ phase change was imparted to the pump photons. The decrease in peak coincidence counts, as the electrical phase shifter power increased, was due to unwanted thermal cross talk within the ring due to the proximity of one of the rings to the phase shifter.

Any of the rings 90 may comprise one or more phase shifters (not shown) disposed along at least part of the ring 90 to fine tune the resonance response of the ring 90. Preferably the phase shifter 90 is a thermo-optic phase shifter. Preferably the phase shifter is configured to impart a phase shift to over 50% of the ring loop, more preferably over 80%.

In principle any of the ring resonators 90 may be optically coupled to the waveguide arm 6, 8 and/or other rings 90 using any suitable optical coupling method and/or structure, for example using an MMI. Preferably the rings 90 are coupled to the arm 6, 8 and any other rings 90 by evanescent coupling.

In principle any of the ring resonators 90 described above may be replaced by any passive integrated optic resonator device, such as, for example a micro-disc resonator.

The optical source 2 may comprise one or more dispersion management devices (not shown in the figures) configured to the adjust group velocity of the photons propagating in one or more resonators 90 either backwards or forwards to match the group velocity of an equivalent ring resonator 90 on another arm 6, 8.

Embodiments of the present invention have been described with particular reference to the examples illustrated. However, it will be appreciated that variations and modifications may be made to the examples described within the scope of the present invention.

The invention claimed is:

1. An integrated optical device for generating photons, the device comprising:
   i) an integrated optical splitter configured to receive pump light; and,
   ii) a first integrated optical arm optically coupled to the splitter and configured to receive a first portion of the pump light output from the splitter; and,
   iii) a second integrated optical arm optically coupled to the splitter and configured to receive a second portion of the pump light output from the splitter;
      each arm comprising a photon pair source separate from and substantially identical to the photon pair source of the other arm; each photon pair source being configured to be able to convert at least one pump light photon into a signal and idler photon pair;
      each of the first and second arms being configured to guide pump, signal and idler optical waveguide modes; wherein the pump, signal and idler optical waveguide modes guidable by the first arm are indistinguishable from the respective pump, signal and idler optical waveguide modes guidable by the second arm;
   iv) an integrated optical combiner device in optical communication with a first and a second optical output path and configured to be able to interfere light from the first and second arms and output the signal and idler photons by:
      a. bunching the signal and idler photons together in one of the optical output paths; or,
      b. anti-bunching the signal photon in one output path and the corresponding idler photon in the other optical output path.

2. An integrated optical device as claimed in claim 1 further comprising a phase shifter device configured to be able to impart a phase difference between the first and second arm.

3. An integrated optical device as claimed in claim 2 wherein the phase shifter device comprises a thermo-optical phase shifter configured to provide localised heating to one of the waveguide arms.

4. An integrated optical device as claimed in claim 2 wherein the phase shifter device is configured to be able to impart a phase difference between the arms of at least $\pi/2$.

5. An integrated optical device as claimed in claim 1 wherein the splitter comprises any one of a directional coupler, MMI coupler, star coupler, X-coupler, or Y branch.

6. An integrated optical device as claimed in claim 1 wherein the combiner comprises any one of a directional coupler, MMI coupler, X-coupler, or star coupler.

7. An integrated optical device as claimed in claim 1 further comprising an integrated optical input waveguide configured to input pump light to the splitter.

8. An integrated optical device as claimed in claim 1 wherein the first and second optical output paths comprise separate integrated optical waveguides.

9. An integrated optical device as claimed in claim 1 wherein the photon pair sources comprise a $\chi^{(3)}$ nonlinear medium.

10. An integrated optical device as claimed in claim 9 wherein the nonlinear medium is configured to annihilate two pump photons to generate the photon pair using spontaneous four wave mixing.

11. An integrated optical device as claimed in claim 1 wherein each photon pair source comprises an integrated optical waveguide.

12. An integrated optical device as claimed in claim 1 wherein any of the integrated optical waveguides, combiner or splitter comprises a silicon core material.

13. An integrated optical device as claimed in claim 1 wherein the splitter device comprises a coupling ratio of approximately 50%.

14. An integrated optical device as claimed in claim 1 wherein the combiner device comprises a coupling ratio of approximately 50%.

15. An integrated optical device as claimed in claim 1 wherein the photon pair source comprises a ring resonator optically coupled to the associated integrated optical arm.

16. An optical assembly comprising the integrated optical device as claimed in claim 1 and a pump light source.

17. An optical assembly as claimed in claim 16 further comprising an optical amplifier optically coupled between the pump light source and the splitter device.

18. An optical assembly as claimed in claim 17 further comprising a first wavelength filter optically coupled between the optical amplifier and the splitter device.

19. An optical assembly as claimed in claim 16 further comprising a second wavelength filter in optical communication with an output optical path.

20. An optical assembly as claimed in claim 16 wherein any of the pump light source, optical amplifier, first and second wavelength filters are integrated with the said integrated optical device.

21. An optical assembly as claimed in claim 18 wherein any of the wavelength filters comprise an Arrayed Waveguide Grating.

22. An optical assembly as claimed in claim 17 wherein the optical amplifier comprises a Semiconductor Optical Amplifier.

23. A method for generating photons comprising the steps of:
i) providing pump light;
ii) splitting the pump light, at a first location with an integrated optical splitter device, into separate first and second integrated optical arms; wherein each arm comprises a photon pair source separate from and substantially identical to the photon pair source of the other arm;
iii) converting at least one pump light photon into a signal and idler photon pair in a photon pair source of at least one of the integrated optical arms; the said at least one integrated optical arm being configured to guide pump, signal and idler optical waveguide modes that are indistinguishable from the respective pump, signal and idler optical waveguide modes guidable by the other integrated optical arm;
iv) providing at a second location an integrated optical combiner device:
　a. configured to be able to interfere light from the first and second arms; and,
　b. in optical communication with a first and a second optical output path;
v) outputting the signal and idler photon pair from the combiner device by either:
　a. bunching the signal and idler photon pair by outputting the said pair in one of optical output paths; or,
　b. anti-bunching the photon pair by outputting the signal photon in one optical output path and outputting the corresponding idler photon in the other optical output path.

24. The method as claimed in claim 23 further comprising the step of:
providing a phase relationship between the first and second arms, the phase relationship determining whether the combiner device bunches or anti-bunches the photon pair.

25. The method as claimed in claim 24 wherein the phase relationship is a phase difference, the method further comprising the step of:
adjusting the optical path length of at least one of the arms to provide the phase difference between the first and second arms.

26. The method as claimed in claim 25 further comprising the step of adjusting the phase difference using a phase shifter device.

27. The method as claimed in claim 23 wherein one or both of the splitter device and combiner device are integrated optical waveguide couplers.

28. The method as claimed in claim 23 further comprising the step of:
coupling approximately 50% of the pump light into each of the first and second arms.

29. The method as claimed in claim 27 wherein the combiner device is a 2×2 optical coupler comprising an approximate 50/50 coupling ratio.

30. The method as claimed in claim 23, wherein each photon pair source comprises an integrated optical waveguide, the method further comprising the step of generating the photon pair with one of the said integrated optical waveguides.

31. The method as claimed in claim 23 wherein converting at least one pump light photon into a signal and idler photon pair comprises:
annihilating one or more pump light photons of the same wavelength and generating a signal photon and idler photon pair, each of the signal and idler photons comprising wavelengths that are different to the pump photons and to the corresponding photon of the pair.

32. The method as claimed in claim 23 further comprising the step of generating the photon pair by annihilating two pump photons.

33. The method as claimed in claim 23 wherein:
providing pump light comprises providing two monochromatic light sources of different wavelengths,
converting the at least one pump light photons into a signal and idler photon pair comprises:
annihilating two pump light photons of different wavelengths and generating a signal photon and idler photon, wherein each of the signal and idler photons comprises a wavelength that is identical to the corresponding photon of the pair and different to the pump photons.

* * * * *